June 7, 1932.  A. A. CLIFTON  1,861,594

FRONT WHEEL DRIVE UNIT

Filed Aug. 22, 1930

Inventor
Amert A. Clifton,
By Minturn & Minturn,
Attorneys.

Patented June 7, 1932

1,861,594

UNITED STATES PATENT OFFICE

AMERT A. CLIFTON, OF INDIANAPOLIS, INDIANA

FRONT WHEEL DRIVE UNIT

Application filed August 22, 1930. Serial No. 477,045.

This invention relates to the art of automobile front wheel drives and particularly to means permitting the steering of the driven wheels without the employment of the heretofore customary universal joints.

A primary object of my invention is to provide a front axle to carry the load and through which axle the wheels may be driven without having to provide a second load carrying axle.

A primary object also resides in the means for providing a flexible drive from the axle to the wheels thereon that may be fully enclosed and be protected from dust and mud.

An important object resides in the general combination of elements which permits a lighter weight front end structure as applied to front wheel drives.

Other objects reside in the simplicity, low cost of production, and the inherent relatively long life of the structure.

Figure 2:
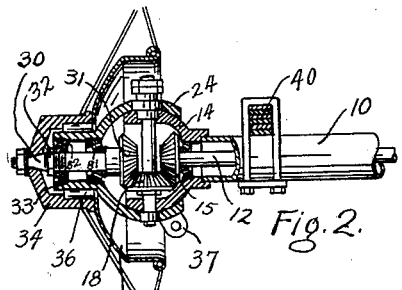
Figure 1:
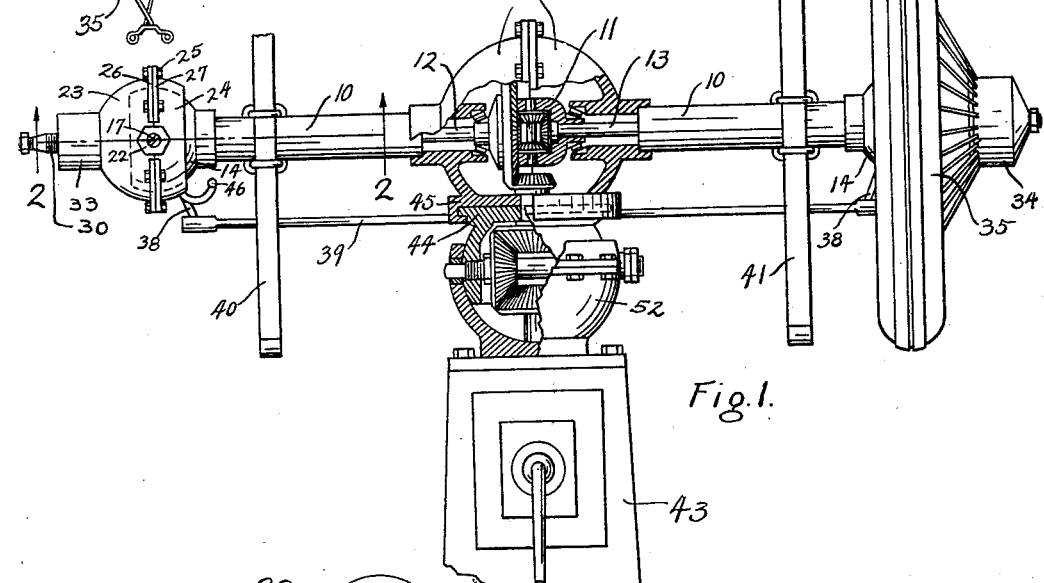

These and other objects will become apparent in the following description of the invention as illustrated by the accompanying drawing, in which Fig. 1 is a fragmentary top plan view of an axle embodying my invention;

Fig. 2, a longitudinal vertical section on the line 2—2 in Fig. 1; and

Figure 3:
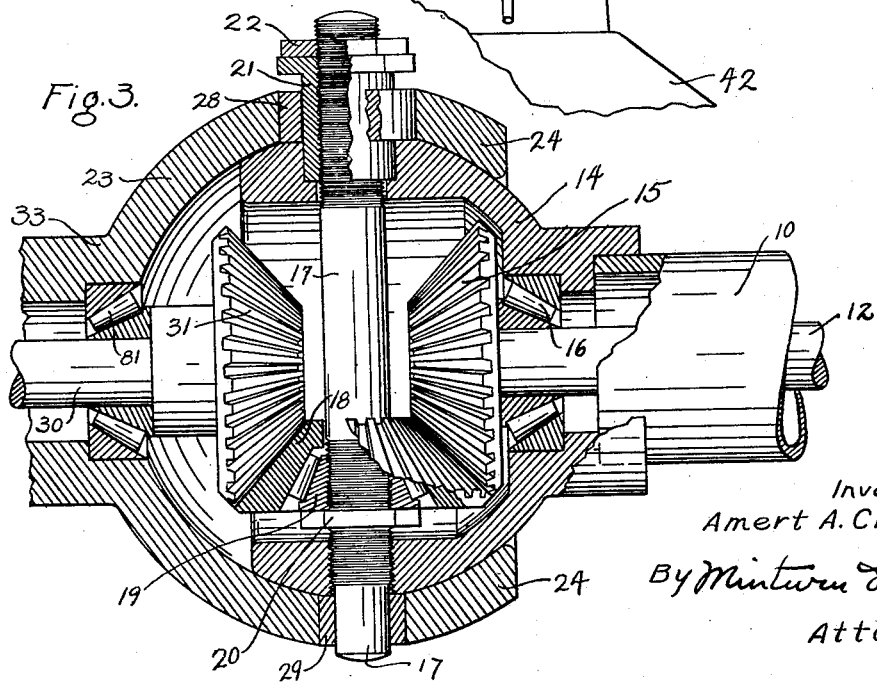

Fig. 3, a longitudinal vertical section through a swivel joint on an enlarged scale.

Like characters of reference indicate like parts throughout the several views in the drawing.

I employ a tubular axle 10 in the center of which is the customary differential drive 11 from which the drive shafts 12 and 13 extend axially through the housing 10. At each outer end of the axle 10 is fixed a segment 14 of a hollow ball, and a bevel gear 15 is carried within the segment fixed on the end of the respective shafts 12 and 13 with a radial and thrust bearing 16 supporting the shaft immediately back of the gear.

A king pin 17 is entered vertically through a smooth hole in the top of the segment 14 to pass freely through a bevel gear 18, screw-threadedly through the inner race 19 of a thrust bearing, screw-threadedly through a lock nut 20, screw-threadedly through the under side of the segment 14, to have a smooth lower end project downwardly for a distance therebelow. The upper end of the pin 17 is slotted to be turned with a screw driver. The race 19 is adjusted to bring the gear 18 into proper mesh with the gear 15 and is locked in position by the nut 20. The upper end of the pin 17 is threaded to receive therearound a collar 21 which may enter a counter bore in the segment 14 for a distance to abut a shoulder. A lock nut 22 is carried on the pin 17 above the collar to fix the collar in position and thus hold the pin 17 against rotation in the segment 14.

By loosening the nut 22 and collar 21, the pin 17 may be turned to raise or lower the race 19 and hence the gear 18 to obtain the desired adjustment from without the segment.

A hollow ball segment 23 is provided to fit closely about the segment 14 from the outer end and a cupped collar 24 is brought over the segment 14 from the inner side and bolted to the segment 23 by the bolts 25 through the annular companion flanges 26 and 27 to form a ball and socket connection. Bushings 28 and 29 are carried between the segment 23 and collar 24 to receive the pin 17 slidingly therethrough so as to limit the movement of the segment to travel horizontally about the pin 17 as an axis and thereby prevent vertical movement.

The segment 23 has a hollow horizontal cylindrical spindle 33 fixed thereto within which is rotatably carried a stub shaft 30 between the bearings 81 and 82. A bevel gear 31 is fixed on the inner end of the shaft 30 to mesh with the gear 18, lateral adjustment of the shaft being effected by a nut 32 screw-threadedly abutting the inner race of the bearing 82 which is also screw-threadedly carried on the shaft.

The outer end of the shaft 30 extends from the spindle 33 to enter by a tapered driving fit into the hub 34 of a wheel 35. The hub is carried back around the spindle 33 to bear thereon through a roller bearing 36, Fig. 2. A lug 37 is provided on each collar 24 to which a steering arm 38 is fixed, the outer ends of the arms being pivotally interconnected in the usual manner by a tie rod 39.

The front springs 40 and 41 are fixed directly to the axle 10.

Between a motor 42 and the differential 11 of the axle is carried the usual transmission 43 rigidly attached to the motor in the usual manner but having a flexible but supporting connection with the axle. Immediately ahead of the transmission 43, I provide a swivel support 52 with the rear end fixed to the transmission and identical in structure with that shown in Fig. 3, as above described but with the pin 17 rotated ninety degrees to be in a horizontal position parallel to the axis of the axle 10, and instead of a spindle 33, I provide an annular ring 44 to be slidingly received and retained within an annular recess provided in the rear end of the two halves of the differential housing 45 whereby the axle 10 may rock on its own axis and also rock in a vertical plane about the ring 44, such as when one wheel passes over an obstruction and drops down again.

From the foregoing description, it is thus to be seen, that power applied through the differential 11 of the axle 10 is transmitted by the shafts 11 and 12 to revolve the wheels 35 through the gears 15, 18, and 31, the tie rod 39 preventing thrust between the gears from swinging the wheels, and that the wheels may be swung or steered by pulling or pushing on the drag link arm 46 in the customary manner, the gear 31 being shifted around the gear 18 as the wheel is swung.

While I have here shown and described my invention in the one form now best known to me, it is obvious that structural changes may be made therefrom without departing from the spirit of the invention, and I, therefore, do not desire to be limited to that precise form, nor any more than may be required by the following claims.

I claim:—

1. In a front wheel drive, an axle, a wheel spindle pivoted to the axle, a shaft carried by the spindle, an axle drive shaft, gears in mesh between the two shafts, a differential, a differential housing, a propeller shaft in two parts, a pair of bevel gears one on adjacent ends of said two parts, a counter shaft between the two propeller shaft parts, a bevel gear on the last shaft meshing with the two gears on the propeller shaft, an annular recess in the differential housing and an annular flange on the adjacent propeller shaft part assembled in said recess.

2. In a front wheel drive, an axle, a shaft carried by the axle, a spindle pivotally fitted to the axle, a king pin about which said spindle pivots, a gear on the shaft, a stub shaft carried by the spindle, a gear on the stub shaft, a bearing member and a gear both centered about said pin said gear being meshed with said axle shaft and said stub shaft gears and means by raising the pin for adjusting its gear with the other two.

3. In a front wheel drive, an axle, a hollow ball segment on the end of the axle, a hollow ball segment adapted to fit slidably about the first segment, and a king pin through the two segments limiting the movement therebetween to a horizontal direction, a wheel spindle fixed to the said second segment, a driving member carried by the axle, a shaft carried by the spindle, and flexible driving means between said member and said shaft confined within said segments, said driving means comprising a gear driven by said member, a gear fixed to said shaft, a bearing member carried by said pin, a gear carried by said pin meshed with said other gears and resting on the race and means for adjusting the last gear with the other gears by rotating the pin to raise and lower the bearing member.

4. In a front-wheel drive, an axle, a shaft carried by the axle, a spindle pivotally fitted to the axle, a king pin about which the spindle pivots having a threaded portion, a gear on the shaft, a stub shaft carried by the spindle, a gear on the stub shaft, a gear mounted on the king pin said gear being meshed with the axle shaft and stub shaft gears, a gear bearing member threadedly mounted on the king pin below the king pin gear and raised or lowered to adjust the gear by rotating the king pin.

In testimony whereof I affix my signature.

AMERT A. CLIFTON.